Patented Sept. 6, 1938

2,129,153

UNITED STATES PATENT OFFICE 2,129,153

RESINLIKE CONDENSATION-PRODUCTS

Erik Schirm, Dessau-in-Anhalt, Germany

No Drawing. Application November 4, 1935, Serial No. 48,208. In Germany November 6, 1934

1 Claim. (Cl. 260—2)

It has been found that technically valuable resin-like condensation-products containing at least three carbon rings in the molecule are obtainable by bringing into reaction, in presence of catalysts, aromatic or aromatic-alicyclic hydrocarbons or their mono- or polyvalent hydroxy-derivatives which may also be etherified, together with mono- or polyvalent alcohols of the alicyclic, of the mixed alicyclic-aromatic or fatty-aromatic series or with their halogen hydracid esters.

Instead of the aforesaid hydrocarbons or their hydroxy-derivatives one may also advantageously use the condensation-products of these bodies together with aldehydes and ketones or their derivatives serving as initial materials for the production of the new resin-like bodies.

Furthermore it has been found that instead of the alcohols used as initial materials one may also make use of unsaturated hydrocyclic hydrocarbons which are or may be considered as being produced by dehydration of those alcohols. The advantage of the use of those unsaturated hydrocarbons instead of the alcohols is to be seen in the fact, that in this case no water is formed during the conversion that would dilute the catalyst or reduce or end its efficiency.

A subsequent hydrogenation of the thus obtained condensation-products has proved particularly valuable, because in many cases it improves very advantageously the fastness of these products to light and air. The hydrogenated condensation-products differ furthermore from the non-hydrogenated products by their colourlessness, their lower specific gravity and, whenever they are volatile without decomposition, by somewhat lower boiling-points.

As aromatic or aromatic-alicyclic hydrocarbon- or phenol-components of the condensation-products to be produced according to the present invention, there may be mentioned e. g.: benzolhydrocarbons, di- and polycyclic hydrocarbons containing at least one aromatic nucleus, phenol and its homologues and substitution-products such as chloro- or nitrophenols, o- and p-cyclohexyl-phenol, resorcin, 1- and 2-naphthol, 5- and 6-tetralol, 4, 4'-dioxydiphenyl-methane, 4, 4'-dioxy-dinaphthyl-1, 1'-methane, o- and p-oxy-diphenyl, anisol, phenetol, diphenyl ether, the cresol- and naphthol ethers, guaiacol, creosol, diphenylene-oxide and the like.

As commercially obtainable alcohol components for the condensation, the following compounds may be considered as examples: terpene alcohols such as menthol, terpineol, terpin and terpin hydrate, borneol and iso-borneol, fenchyl alcohol, cyclohexanol and its homologues such as the methylcyclohexanols and dimethylcyclohexanols, o- and p-ethyl- and butylcyclohexanol and the octyl-cyclohexanols, o- and p-cyclohexyl-cyclohexanol and their homologues, 2,6-dicyclohexyl-cyclohexanol, o- and p-phenyl- or benzyl-cyclohexanol, cyclohexandiol, 1,4 and furthermore 1- and 2-decalol, 1- and 2-tetralol, benzyl alcohol, 1-naphthyl-carbinol, β-phenyl-ethyl-alcohol, 1-(β-oxethyl-)naphthalene and others.

Among the unsaturated hydrocyclic hydrocarbons which are suitable for use instead of the above mentioned alcohols, though not permitting production to be accomplished from the same by dehydration, there are e. g.: pinene, limonene, the dipentene and the other terpenes and sesquiterpenes as well as the ethereal oils containing the same as their chief constituent, such as turpentine oil.

As catalysts for the present procedure the following materials have proved to be suitable: inorganic acids such as sulfuric acid, phosphoric acid, halogen hydracid, perchloric acid containing water, furthermore metal salts such as anhydrous chloride of magnesium, of calcium, of zinc, also boro-, aluminum-, and iron-chloride, tin-tetra-chloride and also zinc powder and surface-catalysts such as bleaching clays (fuller's earth), activated carbons and the like. In many cases it is recommended that the condensation-reaction be performed in the presence of inert diluting agents which may be e. g. one of the two reaction-components, or likewise liquids which under the given working conditions, do not take part in the reaction process.

The products obtained according to the present method possess very valuable technical properties. The lower molecular condensation-products some of which are viscous liquids at normal temperatures dissolve easily in the most varied organic solvents such as ether, alcohol, acetone, acetic ester, benzol, toluol and the like. Said products have strong adhesive properties and therefore may serve as adhesive substances for many technical purposes e. g. for paper-gluing, for the gluing of leather, wood and the like, furthermore as a component of various sorts of lute, as a sliding-preventive for floor-waxes and driving-belt waxes, for the manufacture of adhesive fats and adhesive waxes, of draw-fats and spreading-masses for medical plasters. As they are unaffected by atmospheric oxygen they are also most suitable for the manufacture of insect-catching glues such as caterpillars- and fly-lime and for the manufacture of grafting wax. They are also excellent light-fast softening agents for lacquers, films and foils made with a base composed of cellulose esters or -ethers and because of their oil-solubility they may also be employed for oil-, resin- and combination-lacquers, for the manufacture of oil-cloth and linoleum as well as in the varnish-industry. The condensation-products are also suitable for the manufacture of printing colours and intaglio-colouring stuffs, printing-pastes for leather- and cloth-printing, of spreading masses for stencil sheets, for the manufacture of lubricating products of many kinds such as solid greases, oil-graphite and the like. The condensation-products being inodorous are advantageously appliable as fixing agents for volatile materials such as odoriferous substances, and their chemical inertness renders them suitable also as addition agents for explosives. Furthermore, they have proved to be excellent as dispersion-stabilizers for oils, fats and waxes e. g. as ointment bases, as addition substances to flotation agents and the like and also as froth stabilizators. The condensation-products may also be used as filling- and diluting-agents for soaps and for the impregnation of textiles, leather, wood and other materials as well as for the working up of caoutchouc and for the manufacture of activated carbon.

The higher molecular condensation-products comprise artificial resins which are of a brittle hardness, when cold, but upon warming they liquefy and these resins are distinguished also by their good fastness to light. Their possibilities of application are about the same as those of the lower molecular condensation-products. Among other uses they yield together with cellulose derivatives excellent combination-lacquers. By the fact that they dissolve also in linseed oil and in other drying oils, they are particularly suited for the preparation of combined resin-oil-lacquers. Moreover they may be used instead of colophony, for the manufacture of plastic artificial or pressed masses of many sorts, in combination with casein-, Bakelite resin- and alkyd resin masses, for the lining of vessels or for the manufacture of various articles of all kinds and also of isolating materials.

The following examples illustrate the preferred form of the invention which however, are not to be construed as limiting the real scope of the invention. The parts of the reacting means given in these examples correspond to parts of weight.

Example 1

In 264 parts of tetrahydronaphthalene 154 parts of 2-decalol (melting point 75° C.) are dissolved during warming, then 240 parts of a 94%-sulfuric acid are stirred into this solution at 35° C. During constant stirring the temperature is maintained for about 7 hours at 40° C. Now one permits settling to occur and then one draws off the acid layer together with a small amount of tar formed during the reaction. The oil layer is then washed until it is neutral with salt-water and dried, or, without washing, is directly and simultaneously freed from acid by means of quick lime, and dried. Then the oil is fractionated under reduced pressure, whereby first the excess tetrahydronaphthalene and the unaltered decalol will distill over; later followed by the 6-(decalyl-2'-)tetrahydronaphthalene formed as the principal product, in the form of oil of the boiling point 229° C. (under reduced pressure of 12,5 mm.), the yield of which is equal to 143 parts. When cold this product is viscous and nearly colourless. As a distillation-residue there remains a small amount (24 parts) of a clear reddish-yellow resin of a brittle hardness in the cold; this resin comprises apparently a di-decalyl-tetrahydronaphthalene.

The hydrogenation of the two condensation-products thus obtained is in this case as well as in the following examples done according to the same method which, however, may of course in each individual case be altered as by the selection of a different diluting agent (the addition of which is not absolutely necessary), of a different catalyst as well as of a different hydrogen pressure and the temperature for the hydrogenation.

50 parts of the condensation-product are dissolved in 150-200 parts of decahydronaphthalene. This solution, with an addition of 5-10 parts of a nickel catalyst is heated to 230° C. in a stirring-autoclave under a hydrogen pressure of about 35 atm. until no further hydrogen is absorbed. Then one filters the reaction mixture off from the catalyst, distils the decahydronaphthalene under a reduced pressure and then fractionates the residue.

The mono-decalyl-tetrahydronaphthalene as such and in its hydrogenated form in which it may be described as perhydro-$\beta,\beta'$-dinaphythyl, is a good softening agent for cellulose ether such as benzyl cellulose and the like. This product may also be employed for the manufacture of isolating materials and in the varnish-industry.

Example 2

108 parts of o-cresol and 154 parts of 2-decalol are mixed with 150 parts of a 70%-perchloric acid solution. The mixture is then heated up to 100° C. and maintained there for 6 hours during thorough stirring, whereupon it soon becomes viscous. Then one cools the mass down, dilutes it with 100 parts of toluol (which may also be added to the reaction mixture prior to the conversion), separates the oil layer from the acid layer, washes the oil layer with hot water to neutralize the same, then dries it and subjects it to distillation at normal pressure or at a slight sub-atmospheric pressure. After the toluol is distilled off one fractionates under a more reduced pressure. After eliminating the unreacted cresol and any decalol that may be left unreacted, a large amount of crude mono-decalyl-o-cresol is first distilled off under a Hg-pressure of 1,6 mm. and at a temperature of about 170 to 225° C.; then the didecalyl-o-cresol form distills over at about 245 to 260° C. Remarkably no non-volatile residue is left in the still. By a second fractionation both products are obtained in a substantially pure form (1) mono-decalyl-o-cresol boiling at 171° C. (uncorr. under 1,6 mm. Hg-pressure), which is an almost colourless, extremely viscous and sticky syrup, the amount of which is equal to 100 parts, (2) di-decalyl-o-cresol boiling at 250° C. (uncorr. under 1,6 mm. Hg-pressure) a clear slightly yellowish and somewhat adhesive resin of a brittle hardness, the yield of which is 80 parts. The total yield of both products is 82% of the theoretical. Through hydrogenation of the monodecalyl-o-creosol, by following the prescribed given procedure at the end of Example 1, one obtains the 2'-decalyl-o-methyl-cyclohexanol. The latter is distilled under a Hg-pressure of 2 mm. at 158–163° C. whereby there is obtained a syrup clear as water which in the cold is considerably more viscous than the non-hydrogenated initial material. The product is an excellent softening agent fast to light and suitable for use in nitro-cellulose lacquers and combination-lacquers. It serves also as an excellent component for the manufacture of insect-catching glues. Moreover it has proved suitable for the production of many sorts of caoutchouc preparations. The hydrogenated di-decalyl-o-cresol boils under a pressure of 1–5 mm. at 244–245° C. and comprises an adhesive resin, clear as water, which may advantageously be applied as a resin ingredient in combination-lacquers

Example 3

108 parts of the technical mixture of the three cresols are heated for 6 hours during vigorous stirring at temperatures up to 100° C. together with 210 parts of o-methylcyclohexyl-methylcyclohexanol (obtained by the hydrogenation of the technical mixture of the three cresols beside the methyl-cyclohexanols and possesses the approximate boiling limits of 150–160° C. under a Hg-pressure of 14 mm.) and with 150 parts of a 70%-perchloric acid solution. After cooling one adds benzol to the mixture, then the acid layer is separated off and the benzol solution is worked up in a similar way as described in Example 2. By a fractionated distillation under a considerably reduced pressure, one obtains resins which are viscous to solid, even of a brittle hardness, and their fastness to light and air is remarkably improved by the subsequent catalytic hydrogenation. This product is suitable as an addition to lubricating means and for the manufacture of sliding-preventives, adhesive fats and the like.

Example 4

74 parts of 6-tetralol (ar.) and 74 parts of 2-tetralol (ac.) are dissolved in 150 parts of deca-hydronaphthalene. Into this solution 75 parts of a 70%-perchloric acid solution are introduced and stirred in at room temperature whereby a moderate exothermic heating occurs. The thus obtained mixture is then heated for 2 hours up to 100° C. during vigorous stirring, whereupon the aqueous perchloric acid solution is separated off and the oil layer is then worked up as described in Example 2. As a chief product one obtains with quite a satisfactory yield a (tetralyl-2'-)tetralol-6 of the probable constitution-formula:

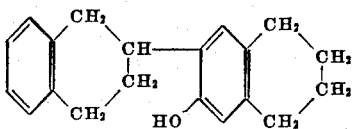

The condensation-product generally distills without decomposition at 250° C. under a pressure of 13 mm. the distilled product representing when cold, a clear yellowish, very viscous resin-like mass showing a bluish-green fluorescence and a strong refraction of light. As a distillation-residue there remains a small amount of a yellowish-red, clear, brittle resin.

These products also are capable of being catalytically hydrogenized without difficulty just as those of the Examples 1 to 3. The hydrogenation-product of the substance characterized by the above formula is a resin having a boiling point of 233° C. (under reduced Hg-pressure of 12 mm.) and is as clear as water and is solid when cold. It is suitable e. g. for the production of spirit lacquers and furthermore it is very usefully employed in the manufacture of plastic and artificial masses of many kinds.

Example 5

72 parts by weight of 1-naphthol are heated up to 100–110° C. and maintained there for 6–8 hours together with 114 parts of a technical mixture of the three methyl-cyclo-hexanols and 150 parts of a 70%-perchloric acid solution. The working up of the reaction mixture is carried out as described in Example 2. As principal product one obtains a resin, which under a considerably reduced pressure distills without decomposing. The product obviously comprises 2,4-(di-methyl-cyclo-hexyl)-1-naphthol. It is suitable for use in the same manner as the above described analogous products and moreover it may be hydrogenated. These products may be usefully employed in the manufacture of printing colours, printing pastes and the like, but they are also excellent as an addition for the production of masses to be used in the manufacture of stencil sheets.

Example 6

72 parts by weight of 2-naphthol are vigorously stirred for 4 hours at 90–100° C. together with 91 parts of p-cyclohexyl-cyclohexanol, 200 parts of deca-hydronaphthalene and 75 parts of a 70%-perchloric acid solution. After separation from the aqueous acid the deca-hydro-naphthalene solution is worked up according to the instructions given in the preceding examples. By fractionating under a considerably reduced pressure a condensation-product is obtained which may be represented substantially as 1-(4'-cyclohexyl-cyclohexyl-)naphthol-2. It is resin-like and is capable of being hydrogenated in the same way as the above described products. This product may serve for a great number of technical purposes such as are already specified in the preceding examples.

Example 7

55 parts by weight of resorcin are heated to 150–175° C. together with 158 parts of 1-naphthyl-carbinol and 50 parts of zinc chloride free from water until the evolution of water vapors cease. The thus obtained molten mass is then boiled with a very dilute solution of hydrochloric acid, whereupon it is washed with water to produce a neutral mass and dried. In this manner one thus obtains a resin, which consists substantially of di-(1-naphthyl-carbinyl-)resorcin. These products are excellent adhesive and luting means for leather, wood and the like.

Example 8

50–100 parts by weight of p,p'-dioxydiphenyl-methane are substituted for the 108 parts of the cresol-mixture specified in Example 3 and are treated in the same way as therein indicated. In distilling off the benzol used as a diluting agent, one obtains immediately an artificial resin which cannot be volatilized without decomposition. It is capable of being easily hydrogenated by following the instructions given in Example 1.

Example 9

Bornyl-chloride is dissolved in ten times the amount of dry benzol. This solution, during cooling, is mixed in small portions with anhydrous aluminum chloride in an amount equal to ¼ of the amount of bornyl-chloride used. When active reaction ceases one warms the mass on a water-bath until no more hydrochloric acid is developed. Now one pours the reaction mixture upon ice. The precipitate of aluminum compounds is then dissolved with hydrochloric acid, and the benzol layer is separated off, whereupon one washes until neutrality is reached, dries and distils (at the end under a considerably reduced pressure). One obtains in this manner liquid and solid resins of similar properties to those described in the preceding examples the same being suitable for many technical application-purposes.

Example 10

10 parts by weight of zinc powder are suspended in 100 parts of xylol and using a reflux condenser the mixture is heated up to boiling while it is being stirred. Then during continuous stirring and boiling, one adds little by little 176.5 parts of 1-(chlormethyl) naphthalene and continues stirring and heating until the reaction is finished. Now the xylol-solution is separated off from the zinc compounds and one washes the latter to neutralize the same, whereupon they are dried and fractionated. The naphthyl-xylyl-methane thus obtained as a chief product yields upon perhydrogenation a viscous liquid that can be used analogously to the product of Example 1.

Example 11

94 parts of freshly-distilled phenol are heated in a stirring-autoclave to 135° C. for one hour and then to 190–200° C. for three hours, together with 192 parts of methylcyclohexene obtainable by dehydration from the technical mixture of the three methylcyclohexanols, and with 50 parts of bleaching clays (of the mark "Tonsil") dried at 130° C. The thus obtained reaction mixture after it has cooled down is diluted with benzol. Next it is filtered off from the bleaching clay and is distilled. After eliminating the benzol on continues distilling under reduced pressure, whereby the initial portions passing over continue to be viscous liquids, whilst the subsequent portions when passing over solidify to a resin-like state. The residue is a resin of a brittle hardness. Also in this case the condensation-products can be hydrogenated without difficulty and they are very suitable for the manufacture of plaster-spreading masses.

Example 12

To a vigorously stirred mixture of 6 parts of the technical mixture of the three cresols and of 1 part of a 38%-hydrochloric acid, one adds little by little and at room-temperature 2 parts of freshly-distilled balsam-turpentine oil (boiling point 158–162° C. under normal pressure) whereby a moderate exothermic-heating is observed. Then one heats the mixture, while stirring constantly and vigorously, up to 90–100° C. for 4 hours. Now one separates off the acid layer, whereupon the oil layer after washing with saltwater and drying is fractionated under reduced pressure, with the result that the surplus of cresol applied as well as any turpentine oil left unaltered will pass over. Then follows a portion of the reaction products in the form of a high-boiling viscous liquid, the more volatile portions of which are viscous when cold, whilst with the further advancement of the distillation resin-like fractions which later solidify are obtained. The residue is a resin of brittle hardness.

The various condensation-products may be employed as such or after hydrogenating, for the same purposes as the products described in the preceding examples.

In the present example the hydrochloric acid may be substituted with concentrated phosphoric acid. In this case it is recommended that the reaction mixture be heated for 6–8 hours.

I claim:

A new resin-like product obtained by the condensation of o-cresol and 2-decalol and subsequent hydrogenation of the condensation-product.

ERIK SCHIRM.